United States Patent
Akopian et al.

(10) Patent No.: US 6,768,451 B2
(45) Date of Patent: Jul. 27, 2004

(54) METHOD FOR DETERMINING THE CORRELATION BETWEEN A RECEIVED BEACON SIGNAL AND A RECONSTRUCTED SIGNAL

(75) Inventors: David Akopian, Tampere (FI); Jari Syrjarinne, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/402,390

(22) Filed: Mar. 27, 2003

(65) Prior Publication Data

US 2004/0012521 A1 Jan. 22, 2004

(30) Foreign Application Priority Data

Mar. 28, 2002 (WO) .............................. PCT/IB02/00982

(51) Int. Cl.[7] .............................. G01S 5/02; H04B 7/185
(52) U.S. Cl. .................. 342/357.12; 342/378; 701/213
(58) Field of Search ........................... 342/357.12, 378; 701/213

(56) References Cited

U.S. PATENT DOCUMENTS

| 5,579,338 A | 11/1996 | Kojima |
| 6,181,911 B1 | 1/2001 | Sih et al. |
| 6,346,911 B1 | 2/2002 | King |
| 6,459,407 B1 | 10/2002 | Akopian et al. |

FOREIGN PATENT DOCUMENTS

WO          0179877        10/2001

OTHER PUBLICATIONS

"*Global Positioning System Overview*," by Peter H. Dana, publication from website http://www.colorado.edu/geography/gcraft/notes/gps/gps.html, Oct. 18, 2002, 12pp.

Primary Examiner—Theodore M. Blum
(74) Attorney, Agent, or Firm—Ware, Fressola, Van Der Sluys & Adolphson LLP (57) ABSTRACT

The invention relates to a method for determining the correlation between a signal transmitted by a beacon and tracked by a receiver and a reconstructed signal expected to be received at the receiver, wherein the received signal and the reconstructed signal are shifted against each other. In order to provide a possibility of compensating residual sinusoidal modulations in the tracked signal, it is proposed that at each shifting position, the samples of the received and the reconstructed signal are multiplied and integrated separately in a plurality of sections. The results are multiplied with a shifted and complex conjugated version of itself. The products resulting in this second multiplication are integrated to receive a single final value for each shifting position. Finally, the maximum final value resulting for the different shifting positions is determined, the shifting position with the maximum value being considered as the shifting position with the maximum correlation.

22 Claims, 6 Drawing Sheets

METHOD FOR DETERMINING THE CORRELATION BETWEEN A RECEIVED BEACON SIGNAL AND A RECONSTRUCTED SIGNAL

CROSS REFERENCE TO RELATED APPLICATIONS

This application claims priority under 35 USC §119 to International Patent Application No. PCT/IB02/00982 having an international filing date of Mar. 28, 2002.

FIELD OF THE INVENTION

The invention relates to a method for determining the correlation between on the one hand a signal transmitted by a beacon and received at a receiver tracking said beacon and on the other hand a reconstructed signal expected to be received at said receiver from said beacon. For determining the correlation, the received signal and the reconstructed signal are shifted against each other. The invention relates in particular to a determination of the correlation for the case that the received signal comprises undesired sinusoidal modulations. The invention relates equally to a corresponding receiver and to a positioning system comprising a receiver.

BACKGROUND OF THE INVENTION

A well known positioning system which is based on the evaluation of signals transmitted by beacons is GPS (Global Positioning System). The constellation in GPS consists of more than 20 satellites employed as beacons that orbit the earth. The distribution of these satellites ensure that usually between five and eight satellites are visible from any point on the earth.

Each of the satellites, which are also called space vehicles (SV), transmits two microwave carrier signals. One of these carrier signals L1 is employed for carrying a navigation message and code signals of a standard positioning service (SPS). The L1 carrier phase is modulated by each satellite with a different C/A (Coarse Acquisition) Code. Thus, different channels are obtained for the transmission by the different satellites. The C/A code, which is spreading the spectrum over a 1 MHz bandwidth, is repeated every 1023 bits, the epoch of the code being 1 ms. The carrier frequency of the L1 signal is further modulated with navigation information at a bit rate of 50 bit/s, which information comprises in particular ephemeris and almanac data. Ephemeris parameters describe short sections of the orbit of the respective satellite. Based on these ephemeris parameters, an algorithm can estimate the position of the satellite for any time while the satellite is in the respective described section. The orbits calculated using ephemeris parameters are quite accurate, but the ephemeris parameters are only valid for a short time, i.e. for about 2–4 hours. The almanac data, in contrast, contain coarse orbit parameters. The orbits calculated based on almanac data are not as accurate as the orbits calculated based on ephemeris data, but they are valid for more than one week. Almanac and ephemeris data also comprise clock correction parameters which indicate the current deviation of the satellite clock versus a general GPS time.

Further, a time-of-week TOW count is reported every six seconds as another part of the navigation message.

A GPS receiver of which the position is to be determined receives the signals transmitted by the currently available satellites, and a tracking unit of the receiver detects and tracks the channels used by different satellites based on the different comprised C/A codes. The receiver first determines the time of transmission of the code transmitted by each satellite. Usually, the estimated time of transmission is composed of two components. A first component is the TOW count extracted from the decoded navigation message in the signals from the satellite, which has a precision of six seconds. A second component is based on counting the epochs and chips from the time at which the bits indicating the TOW are received in the tracking unit of the receiver. The epoch and chip count provides the receiver with the milliseconds and sub-milliseconds of the time of transmission of specific received bits.

Based on the time of transmission and the measured time of arrival TOA of the signal at the receiver, the time of flight TOF required by the signal to propagate from the satellite to the receiver is determined. By multiplying this TOF with the speed of light, it is converted to the distance between the receiver and the respective satellite. The computed distance between a specific satellite and a receiver is called pseudorange, because the general GPS time is not accurately known in the receiver. Usually, the receiver calculates the accurate time of arrival of a signal based on some initial estimate, and the more accurate the initial time estimate is, the more efficient are position and accurate time calculations. A reference GPS time can, but does not have to be provided to the receiver by a network.

The computed distances and the estimated positions of the satellites then permit a calculation of the current position of the receiver, since the receiver is located at an intersection of the pseudo-ranges from a set of satellites. In order to be able to compute a position of a receiver in three dimensions and the time offset in the receiver clock, the signals from four different GPS satellite signals are required.

If navigation data are available on one of the receiver channels, the indication of the time of transmission comprised in a received signal can also be used in a time initialization for correcting a clock error in the receiver. In GPS, an initial time estimate is needed for the positioning. For the initial time estimate, the average propagation time of satellite signal of around 0.078 seconds is added to the time of transmission extracted from the navigation information. The result is used as initial estimate of the time of arrival of a signal, which estimate lies within around 20 ms of the accurate time of arrival. The receiver then determines for different satellites the time at which a respective signal left the satellite. Using the initial estimate of the current time, the receiver forms pseudorange measurements as the time interval during which the respective signal was propagating from the satellite to the receiver either in seconds or in meters by scaling with the speed of light. After the position of the receiver has been calculated from the determined pseudoranges, the accurate time of reception can then be calculated from standard GPS equations with an accuracy of 1 µs.

However, in order to be able to make use of such a time initialization, the navigation data from a satellite signal is needed. Currently, most of the GPS receivers are designed for outdoor operations with good signal levels from satellites. Thus, only good propagation conditions ensure that the navigation data required for the described time initialization is available.

In bad propagation conditions, in contrast, it may not be possible to extract the navigation message accurately enough from received satellite signals, since a high bit-error rate and weak signal levels make a robust decoding of navigation bits impossible. Such bad propagation conditions, which are often given indoors, render the time initialization and the pseudorange measurements more difficult.

For those cases in which the standard time initialization methods can not be applied since the navigation data are noisy, the time initialization process for the receiver can be performed by a time recovery method. Some known time recovery methods are based on the cross-correlation of the tracked signal and an expected signal to define the time of transmission, as will be explained in the following.

Even in bad propagation conditions, the receiver might still be able to track the signal of a GPS satellite and to provide raw data without an evaluation of the contained bit values. Further, some information about the satellites, e.g. ephemeris and/or almanac data, might be obtained from a network, which a-priori knowledge of the GPS signal content would enable a reconstruction of certain fragments of the navigation data stream. The reconstructed data could then be utilized for the time initialization and position calculations using a cross-correlation based technique.

For the cross-correlation methods, the received raw data and expected data are shifted against each other. For each shifting position, a pointwise multiplication of the overlapping parts of the two signals is performed, taking into account different sampling rates. The multiplications for each shifting position are followed by an integration of the results. The best match between overlapping parts of the expected signal and the received raw data is assumed to be given at the shifting position resulting in the highest value in the integration.

This best match allows the determination of a time-stamp, i.e. the last bit edge transmission time, on the received signal, similar to the TOW in the conventional approach. From this time-stamp, the time of transmission of the tracked signal can then be estimated by counting corresponding epochs and chips from this time-stamp. The receiver time can be obtained by adding the average time of flight, or a more accurately estimated value of the time of flight, to the estimated time of transmission. Alternatively, GPS equations can be solved for determining the accurate receiver time. This alternative constitutes the conventional method for determining the accurate receiver time, but it requires an estimated time of transmission of signals from at least four satellites.

In cross-correlation methods, however, a problem might result from distortions in the received signals that are not wiped-off ideally by the tracking loops. In weak signal conditions, the operating mode of the tracking unit of the receiver is quite unstable, and a severe sinusoidal modulation may remain in the tracked raw data. Such uncompensated frequency distortions can result in particular from Doppler frequency shifts caused by relative receiver and satellite movements and by a clock inaccuracy.

Even a small remaining Doppler frequency shift is dangerous, since the cross-correlation based time-recovery methods integrate over several seconds, typically over 1 s to 6 s. Even if a perfect match is achieved during cross-correlation, the cross-correlation value can be very small due to the sinusoidal modulation. This becomes quite evident from the fact that after a correct alignment of the raw data and the reconstructed bits and performing an elementwise multiplication of the samples in both arrays, the data modulation is wiped-off, while the sinusoidal modulation still remains. In a real environment, the Doppler modulation is usually quite random, but in the worst case, a fixed modulation frequency will result. The cross-correlation algorithm will then integrate the complex sinusoid and output a small value. Thus, the match between the received raw data and the corresponding fragment of the expected signal will not be detected.

In a known approach for compensating sinusoidal modulations, the received and the expected signals are both separately multiplied by the shifted complex conjugate copy of the signal itself. Thereafter, the received and expected signals are cross-correlated in a conventional manner.

SUMMARY OF THE INVENTION

It is an object of the invention to provide a cross-correlation method which compensates for residual sinusoidal modulations, in particular Doppler modulations, in tracked signals of a beacon. It is further an object of the invention to provide an alternative to the known approach for compensating for sinusoidal modulations in the tracked signals of a beacon.

These objects are reached according to the invention with a method for determining the correlation between on the one hand a signal transmitted by a beacon and received at a receiver tracking said beacon and on the other hand a reconstructed signal expected to be received at the receiver from the beacon, wherein the received signal and the reconstructed signal are shifted against each other. The proposed method comprises as a first step multiplying a respective overlapping part of the received signal and the reconstructed signal for each shifting position. The multiplication can be performed in particular pointwise between the respective overlapping parts. The multiplications should take into account a possible difference in the sampling rate in the received signal and the reconstructed signal, though.

The proposed method comprises as a second step dividing the overlapping part for each shifting position into sections and integrating the products resulting in the preceding step within each section. It is to be noted that the multiplications in the preceding step do not necessarily have to be completed before these integrations start. Moreover, the division into sections can be performed already before the multiplication of the preceding step on the original samples of the received and on the reconstructed signal. It is only of relevance that the integration of the resulting products is performed separately for each section.

In a third step of the proposed method, the result of the integration of a respective first section is multiplied with a complex conjugated version of the result of the integration of a respective second section. The respective second section has a predetermined distance to the respective first section. This step is performed for a predetermined number of first sections, preferably for all sections as first section for which there exists a second section at the predetermined distance.

The products resulting in the second multiplications are then integrated in a fourth step. Finally, at least the maximum value resulting in the fourth step for the different shifting positions is determined. The shifting position with the maximum value is most probably the desired shifting position with the maximum correlation.

It is to be noted that there may be small variations in the resulting correlation values, due to which the assumed shifting position with the maximum correlation may not be quite correct. It is therefore possible, for example, to determine not only the highest correlation value but a few of the highest correlation values, in case there are doubts that the maximum correlation results in a strong enough value in a certain signal-to-noise condition. All of the associated positions can then be tried in a desired further processing.

The objects of the invention are also reached with a receiver comprising means for receiving and tracking signals from at least one beacon and processing means for realizing the proposed method.

The objects of the invention are further reached with a positioning system comprising a receiver and at least one network element of a network. This network may be a mobile communication network or any other network. The receiver comprises again means for receiving and tracking signals from at least one beacon and processing means for realizing the steps of the proposed method. In addition, the receiver comprises means for communicating with the network.

Finally, the objects of the invention are reached according to the invention with a positioning system, in which the steps of the proposed method are realized by a processing unit of the system which is external to a receiver of the system. The receiver includes in this case means for receiving and tracking signals from at least one beacon and means for providing received and tracked beacon signals to the processing unit. The processing unit can also include other functions. It can be given e.g. by a mobile station to which the receiver is connected and which is able to communicate with a mobile communication network for receiving pieces of information. It can also be given by a network element of a network, in which required pieces of information are available.

The invention proceeds from the idea that the cross-correlation technique employed for time-recovery can be modified in a way that makes it immune to residual sinusoidal modulations. Ordinary cross-correlations perform for each shifting position a multiplication of two signals followed by an integration. According to the invention, this integration is split up into two steps, between which a further operation is inserted. First, the samples resulting in the multiplication are divided into sections, and only a partial integration over the respective samples of each section is performed. The signals resulting in the first integration step are further multiplied by a complex conjugated and shifted version of itself. Only then, the resulting signals are integrated to obtain a single result for one shifting position.

It is an advantage of the invention that the residual modulation in the signals provided by a tracking loop of a receiver are compensated in the cross-correlation itself, which constitutes an alternative to the known approach. It is further an advantage of the invention that the sensitivity of the receiver is increased.

Preferred embodiments of the invention become apparent from the subclaims.

In one preferred embodiment, the length of the sections for the partial integrations is defined by the expected maximum possible frequency of undesired sinusoidal modulations, e.g. a maximum possible Doppler frequency. In addition, the number of samples per bit in the received signal should be taken into account when determining the length of the sections.

In a further preferred embodiment, the predetermined distance between the respective first and second section is equally determined based on an expected maximum possible frequency of undesired sinusoidal modulations present in the received signal. The determination can also be based on the determined length of the sections. The second section can be the section next to the first section, but also be located at a larger distance of the first section.

Advantageously, the received signal is bit-synchronized before the correlation according to the invention is performed, since this enables a correct alignment in each shifting position between the received signal and the reconstructed signal.

The method according to the invention can be employed for computing the accurate time when a received signal was transmitted by a beacon, since to the bits of the reconstructed signal, an identification may be associated which enables to determine the time at which they would have been transmitted by the beacon.

The method according to the invention can further be employed for performing a time initialization of the receiver time based on a computed time of transmission.

For the time initialization, an accurate current time of the receiver at the time of reception of the received signal can be determined as the sum of a determined accurate time of transmission and a time of flight. The time of flight can be determined based on an available position of the beacon at the accurate time of transmission of the received signal and on an available reference position of the receiver.

Alternatively, in case the receiver receives signals from at least four beacons and determines the accurate time of transmission of each of these signals, an accurate current time of the receiver at the time of reception of the received signals can be determined by conventional GPS equations. It is possible to employ different methods for determining the time of transmission of signals in different channels. Thus, it is only required that the time of transmission of the signal from one of the at least four beacons is determined according to the method of the invention as basis for the GPS equations.

It is understood that the employed expression "accurate time" does not refer to an absolute accuracy but only to a quite high accuracy.

In case the receiver is able to communicate with a network, the receiver may receive various information as a basis for the calculations according to the invention. It is to be noted that the receiver can be able to communicate with the network either directly or indirectly, in the case of a mobile communication network for instance via some mobile station. A network may provide a receiver for example with a reference time for the receiver, with a maximum error of this reference time, with a reference position of the receiver and with position information for at least one beacon. The position information can include in particular ephemeris data and/or almanac data for at least one beacon. In some situations, only ephemeris data, only almanac data or both might be available at a network, and only the available data can be provided. As mentioned above, the network providing assistance data can be a mobile communication network, but it can also be any other kind of network which is capable of providing assistance data via a network element, e.g. via a DGPS (Differential Global Positioning system) station.

In an advantageous embodiment of the positioning system according to the invention including a network element of a network, the network element comprises therefore means for receiving and tracking signals from at least one beacon, and moreover means for providing the receiver with at least one of the above mentioned pieces of information. It is to be noted that in case pieces of information are provided by a network, not all of the listed pieces of information have to be provided. The maximum error of a time reference could be specified for example by requirements to the reference time in a standard or a system specification. In this case, there would be no necessity to communicate the maximum error to the receiver, as it is known.

Each of the mentioned data may alternatively be stored in the receiver or be provided by some algorithm in the receiver or a connected processing unit, e.g. another time-recovery algorithm providing an estimate of the current time and the maximum possible error in this estimate. Thus, a receiver according to the invention can also operate independently of assistance data from a network.

If some required information is missing at the processing means, a signal can only be partially reconstructed. But with some care, the method according to the invention can still be applied. Not reconstructed bits could be replaced e.g. by 0, while reconstructed ones will be set to ±1. A control can be maintained in the receiver during each cross-correlation by monitoring the number of "not reconstructed" bits having a value of "0". If that number is not big, the cross-correlation is performed, but if the reconstructed array is found to be almost empty, this fragment is not used and the receiver will wait for a more favorable moment. Since different phases are compared by sliding and cross-correlating, the cross-correlation peak value depends on the number of "unknown" bits at the given stage, which number changes from one sliding position to the next. A kind of scaling may be used to normalize properly, so that the method according to the invention still works normally with some unknown bits.

Preferably, though not necessarily, the modified cross-correlation according to the invention is implemented as software.

The invention can be employed in particular in the current GPS system, but equally in future extended GPS systems with new signals and in other similar beacon based positioning systems such as Galileo. It can further be employed in any system in which a cross-correlation has to be performed with beacon signals received at a receiver.

The beacon can be in particular, though not exclusively, a satellite or a base station of a mobile communication network.

Preferably, though not necessarily, the receiver is a GPS receiver and the beacon is a GPS space vehicle.

BRIEF DESCRIPTION OF THE FIGURES

Other objects and features of the present invention will become apparent from the following detailed description of an exemplary embodiment of the invention considered in conjunction with the accompanying drawings, of which.

DETAILED DESCRIPTION OF THE INVENTION

FIGS. 1 to 6 illustrate a process implemented in a GPS receiver for enabling a time-recovery of the GPS time based on a cross-correlation modified according to the invention. The GPS receiver receives signals from several GPS satellites and is able to track at least one of the satellites by a tracking loop realized in a tracking unit of the receiver by means of a correlator. Further, the GPS receiver comprises the functions of a mobile station and is thus able to receive additional information from a base station of a mobile communication network to which the receiver it is currently attached.

The time at which the last measurements were received by the GPS receiver are referred to as current time, which current time is the time that is to be determined as accurate GPS time in the proposed time-recovery process.

First, some temporal relations existing for a satellite signal will be described, on which temporal relations the proposed time-recovery is based.

Figure 1:
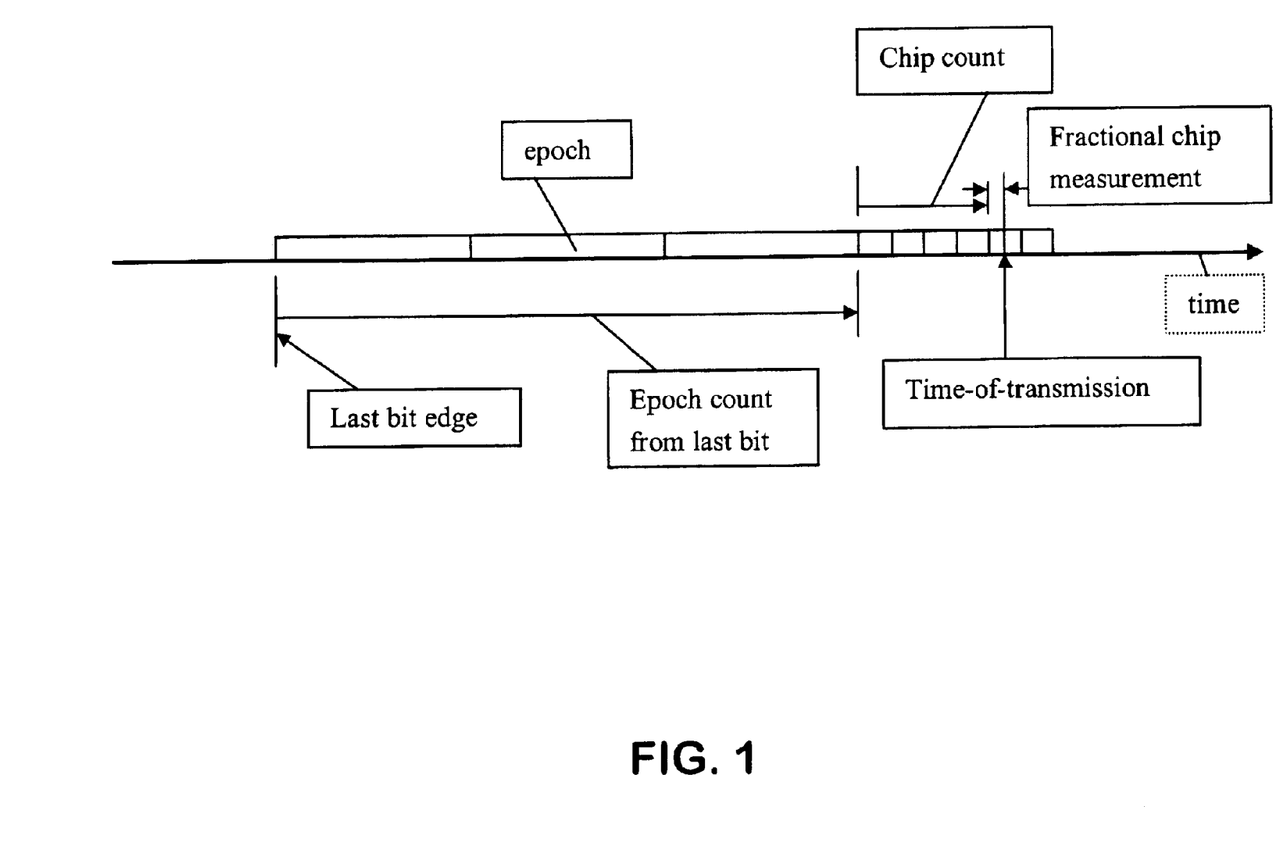
FIG. 1 illustrates the relation between the TOT of a received signal and the preceding last bit edge received in the same channel.

When the receiver tracks a satellite, it is able to count code epochs, each epoch comprising 1023 chips, as well as integer and fractional chips. This is illustrated in FIG. 1 by means of a time bar. On this time bar, the time of transmission of the last bit edge of a previously received signal is indicated. Further indicated on this time bar is the time of transmission of a currently received signal. Whenever the term time of transmission is used in the following without further specification, it always relates to the time of transmission of such a currently received signal. The time of transmission is calculated by subtracting the time of flight TOF, which the signals require to propagate from the satellite to the receiver, from the time of measurement, i.e from the current time. The time of transmission of the last bit edge can be determined in an analogous same way.

A bit-synchronization algorithm applied by the tracking unit to a tracked signal provides for the last bit edge a certain epoch counter reading. Moreover the algorithm provides the epoch/chip counter readings for the signal that was just received. Proceeding from the time of transmission of the last bit edge, the receiver counts the epochs until the time of transmission of a newly received signal. In the example of the figure, 3 entire epochs are counted by the receiver between the time of transmission of the last bit edge and the calculated time of transmission of the current signal. The receiver moreover counts the chips between the last entire epoch and the calculated time of transmission of the current signal. In the figure, there are 4 entire chips indicated between the third epoch and the time of transmission of the current signal. Finally, the receiver performs a fractional chip measurement, calculating the time between the last entire chip and the time of transmission of the current signal. Since epochs and chips have a fixed duration at the satellite, the exact time duration from the transmission of the last bit edge until the transmission of the received signal can be determined based on the epoch and chip count.

As becomes apparent from FIG. 1, there is a one-to-one correspondence between the time of the last bit edge and the time when the new signal left the satellite. This means that an error in the time estimate of the time of transmission results in the same error in the estimate of the time of transmission of the last bit edge. Estimating the time of transmission of the last bit edge accurately would thus allow one to recover the accurate time of transmission of the new signal.

Figure 2:
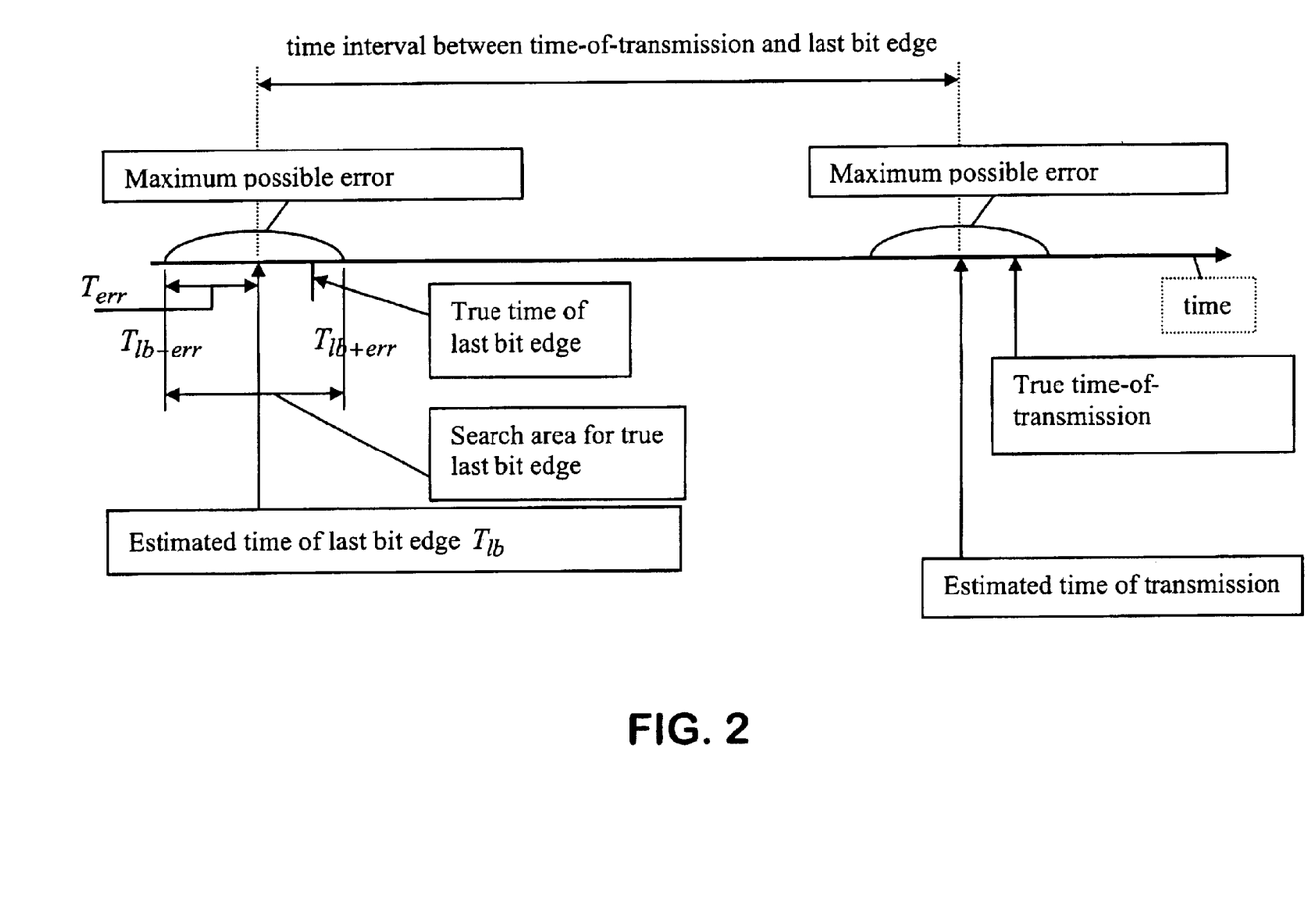
FIG. 2 illustrates the correspondence between the error in an estimated time of transmission and the error in an estimated time of transmission of the preceding last bit edge.

FIG. 2 illustrates by means of another time bar the timing uncertainties that have to be dealt with when determining the accurate time of transmission of the last bit edge.

At the right end of the time bar of FIG. 2, the true time of transmission and an estimated time of transmission of a current signal are indicated. The estimated time of transmission is determined based on an estimate of the current time received from the network and on an assumed time of flight. Inaccuracies in the estimated time of transmission thus result from errors in the estimate of the current time and from errors in the TOF estimate. The true time of transmission lies in an interval given by the estimated time of transmission and a known maximum possible error extending in either direction of this estimated time of transmission. The maximum possible error depends on the quality of the reference time. This interval is also indicated in the figure.

At the left end of the time bar of FIG. 2, the true time of transmission of the last bit edge and an estimated time of transmission of the last bit edge $T_{lb}$ are indicated. The estimated time of transmission of the last bit edge $T_{lb}$ is determined based on the estimated time of transmission of the current signal and on the epoch and chip counts from the last bit edge described with reference to FIG. 1. The time interval between the time of transmission of the current signal and of the last bit edge is indicated in the figure by a double headed arrow.

The estimated time of transmission of the last bit edge $T_{lb}$ has the same maximum possible error $T_{err}$ in either direction as the estimated time of transmission of the current signal. The interval of the possible maximum error of the estimated time of transmission of the last bit edge $T_{lb}$ is equally depicted on the time bar, the interval being delimited by a lower limit $T_{lb-err}$ and a higher limit $T_{lb+err}$, wherein $(T_{lb-err}, T_{lb+err}) \equiv (T_{lb}-T_{err}, T_{lb}+T_{err})$. The true time of transmission of the last bit edge lies within this interval, which interval may thus be considered as a search area for the true last bit edge.

The proposed process enabling a time-recovery of the GPS time is based on these considerations and will now be described with reference to the block diagram of FIG. 3, which shows the different steps of the process. The process is realized by a processing unit of the receiver with a corresponding software.

The processing unit receives from the base station, to which the GPS receiver is currently attached, a reference position of the receiver, a reference time, the maximum possible error of the reference time, and navigation data from at least one satellite. Alternatively, such information can be stored and/or generated within the receiver.

The GPS receiver is currently tracking at least this satellite, and the tracking unit provides in addition the raw data from the corresponding tracking channel to the processing unit. The term "raw data" means that no determination on bit values was performed on the outputs of the correlator of the tracking unit on the base band tracking side. The outputs of the correlator comprise I (in-phase) and Q (quadrature) components, which are provided with some accuracy upon a request from the software of the processing unit.

As mentioned above, the tracking unit further applies a bit-synchronization algorithm on the tracked signal. It is expected that a bit-synchronization is achieved in the channel of interest and that thus the bit edges in the signal are known, even though the bits themselves are not easily identifiable due to noise. The bit edges are easier to detect in weak signal conditions, since the bit-synchronization algorithm is an integration type of routine which narrows the noise bandwidth. Thus, the tracking unit can also provide epoch and chip counts to the processing unit.

Figure 3:
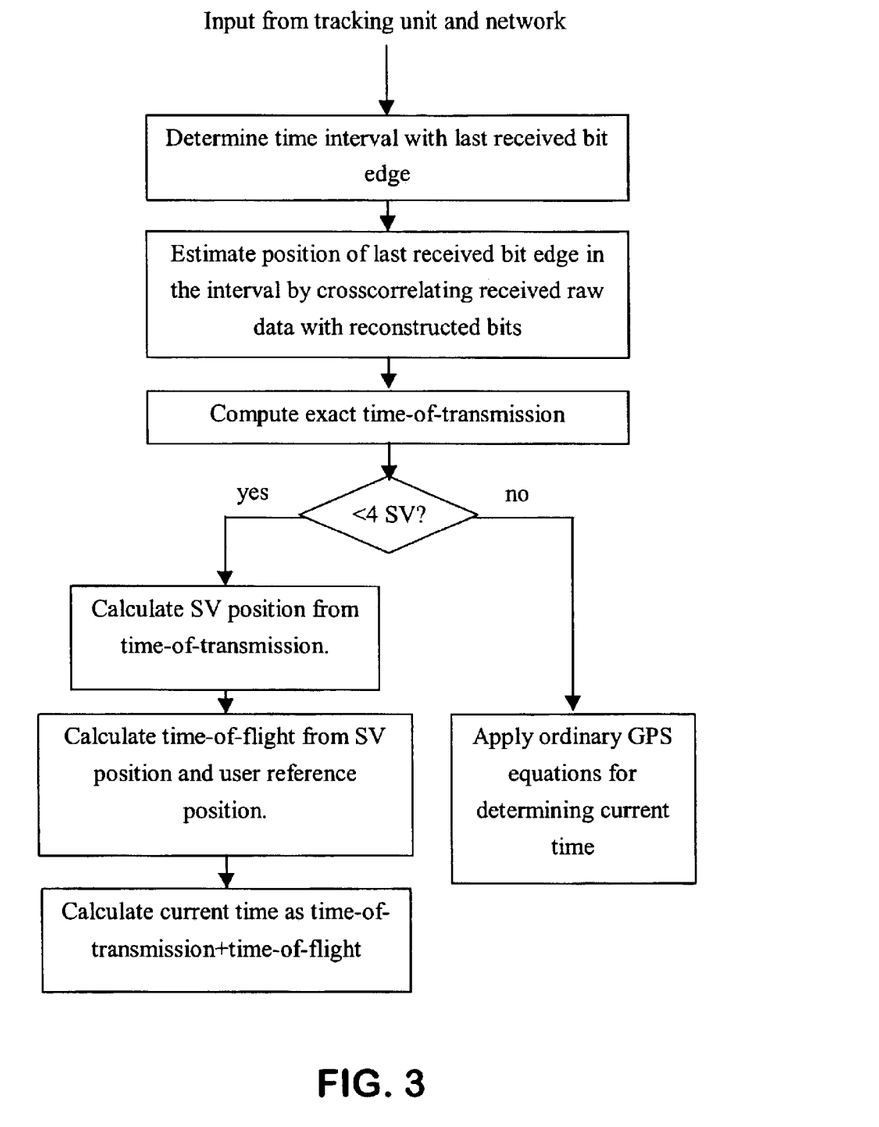
FIG. 3 is a flow chart illustrating a process of determining the current time in a GPS receiver.

In a first step of the process presented in FIG. 3, a time interval is determined which contains the correct GPS time of the transmission of the last received bit edge.

To this end, an estimate of the current time $T_{curr}$ is determined based on the time reference received from the base station or from the local clock. The time uncertainty of the available time estimate, which is equally received from the base station or known from system specifications, is denoted again with $T_{err}$. For determining the desired interval, moreover an estimate of the time of flight $T_{TOF}$ is required, unless a nominal default value of 0.078 s is to be used. The time duration corresponding to consecutive raw samples accumulated up to a last bit edge of the received signal is referred to by $T_{raw}$. The tracking unit of the receiver measures the chip and epoch counts from the last bit edge as described with reference to FIG. 1 and provides them to the processing unit. The entire time equivalent of the counted epochs, chips and fractional chip measurements from last bit edge to the estimated time of transmission of the received signal is denoted as $T_{FromLastBit}$. The time of transmission of the last bit edge from the satellite is then expected to lie in the interval:

$$(T_{lb-err}, T_{lb+err}) \equiv$$
$$(T_{curr} - T_{TOF} - T_{FromLastBit} - T_{err}, T_{curr} - T_{TOF} - T_{FromLastBit} + T_{err})$$

In a second step, which is also indicated in FIG. 3, the time of transmission of the last received bit edge is estimated more precisely. This further estimation is based on cross-correlating the received raw data array with a reconstructed bit array. The determination of the bit reconstruction interval required to this end is illustrated in FIG. 4.

Figure 4:
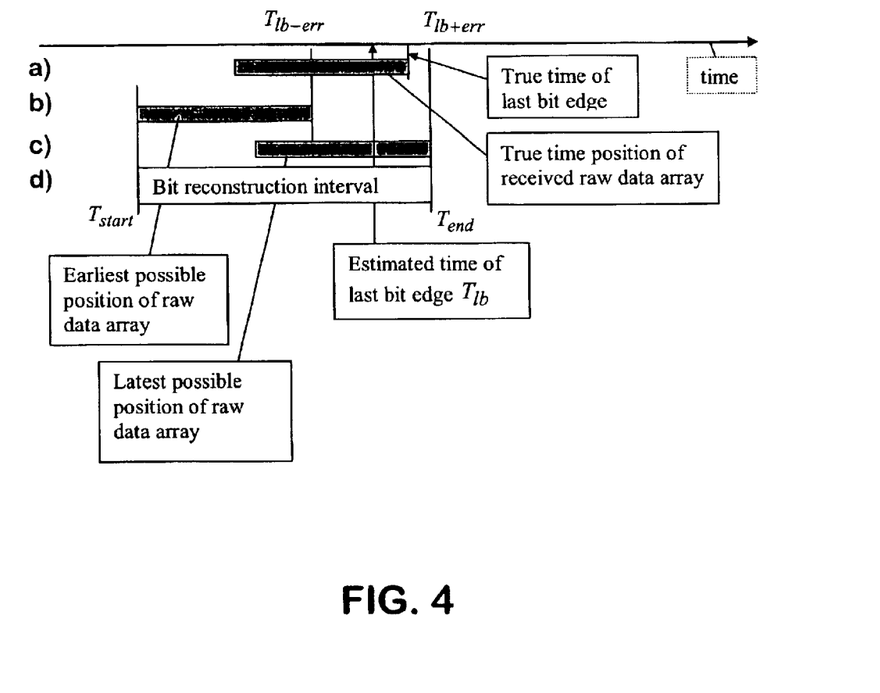
FIG. 4 illustrates the determination of a bit reconstruction time interval for the process of FIG. 3.

FIG. 4 shows another time bar. As in FIG. 2, the estimated time of transmission of the last bit edge $T_{lb}$, the true time of transmission of the last bit edge, and the boundaries $T_{lb-err}$, $T_{lb-err}$ for the maximum possible error in the estimated time of transmission of the last bit edge $T_{lb}$ are depicted. A first horizontal beam a) further illustrates that the true time position of the received raw data with the duration $T_{raw}$ ends exactly with the true time of transmission of the last bit edge, when the raw data is shifted back in time according to the known regularities of the GPS signal. A second horizontal beam b) illustrates the earliest possible position of the raw data array and a third horizontal beam c) the latest possible position of the raw data array, when assuming that the unknown last bit edge time lies within the above defined interval ($T_{lb-err}$, $T_{lb+err}$).

When determining the bit reconstruction interval for which bits have to be reconstructed from available navigation data for the cross-correlation, it has to be ensured that reconstructed bits are available for correlations with the raw data proceeding from the depicted earliest possible position to the depicted latest possible position. This means that reconstructed bits have to be provided beginning at a time of the duration $T_{raw}$ of the raw data before the earliest possible bit edge time $T_{lb-err}$, and ending with the latest possible last bit edge time $T_{lb+err}$.

The bit reconstruction interval, which is shown as fourth horizontal beam d) in FIG. 4, can thus be calculated to:

$$(T_{start}, T_{end}) \equiv (T_{lb-err} - T_{raw}, T_{lb+err}).$$

In a next step, a navigation data reconstruction routine of a frame-reconstructor of the processing unit is called. The routine reconstructs the navigation data bits using the satellite parameters received from the network. The navigation bits are reconstructed for the entire determined time interval ($T_{start}$, $T_{end}$). Each bit in the reconstructed array of bits can be identified by its address in the navigation message, i.e. by the frame number, by the subframe number and by the bit index in that subframe.

Figure 5:
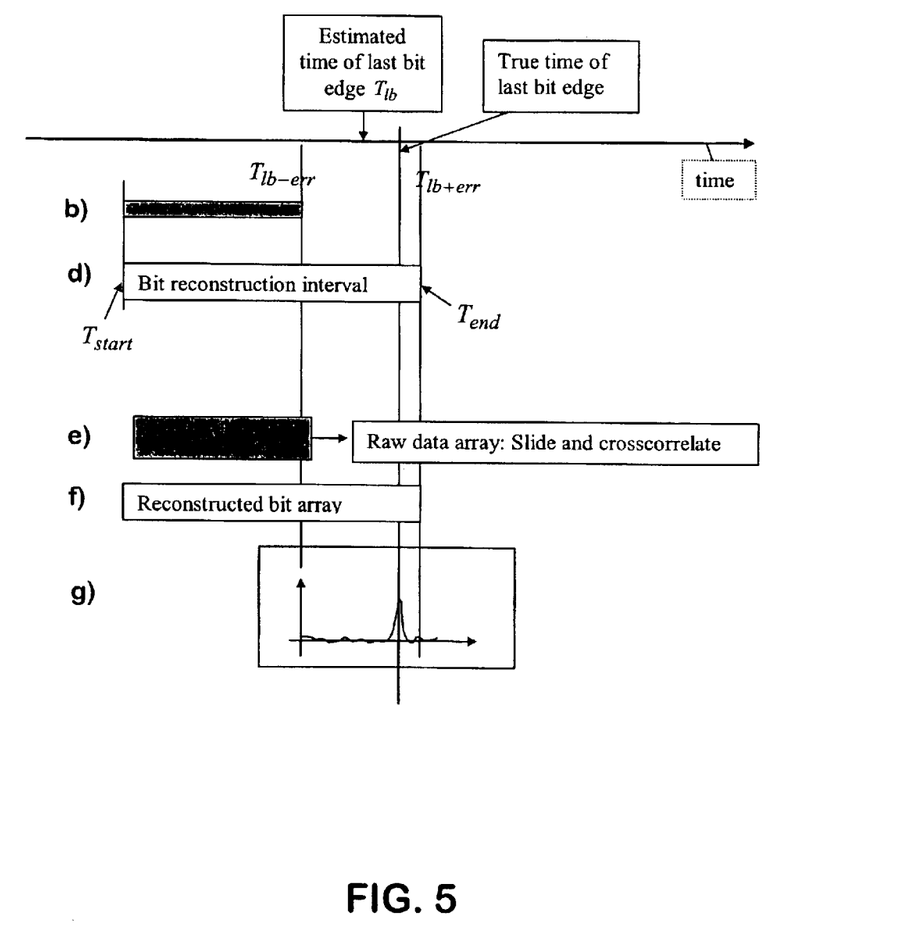
FIG. 5 is a continuation of FIG. 4 and illustrates the cross-correlation of a raw data array with a reconstructed bit array.

FIG. 5 is a continuation of FIG. 4 and shows again the true time of transmission of the last bit edge, the estimated time of transmission of the last bit edge $T_{lb}$, the limits for the maximal possible error of the estimated time $T_{lb-err}$ and $T_{lb+err}$, a horizontal beam b) indicating the earliest possible position of the raw data array and a horizontal beam d) representing the bit reconstruction interval. In addition, the reconstructed bit array is depicted in FIG. 5 as horizontal beam f).

In a third step of the process illustrated by the flow chart of FIG. 3, a cross-correlation is performed between the raw data array, represented in FIG. 5 by a horizontal beam e), and the reconstructed bit array of beam f), in order to find the best match between the raw data and a specific fragment of the reconstructed bit array.

The accumulated data in the raw data array of beam e) is compared to different fragments of the reconstructed bit array of beam f), which fragments have the same duration $T_{raw}$ as the raw data array, by shifting the raw data array along the reconstructed bit array and cross-correlating overlapping sections at each shifting position. The results of the cross-correlations at each shifting position are collected in an array. A diagram g) presenting an exemplary distribution of the values in such an array is shown in FIG. 5, the values being associated to the last bit in the respective fragment of the reconstructed bit array employed in a correlation on the time bar. From this array, the maximum absolute value is selected and the corresponding shifting position determined. The fragment of the reconstructed data array associated to this shifting position is expected to constitute the best match for the raw data array. In FIG. 5, the diagram shows accordingly a clear maximum at the true time of transmission of the last bit edge.

The last received bit of the raw data array can thus be associated to the last bit in the determined fragment of the reconstructed array. Since the bit addresses of all reconstructed bits in the reconstruction interval are known, also the last bit of the determined fragment can be clearly identified. The identification of the last bit in a subframe/bit-in-subframe format allows finding of the exact GPS time of the transmission of the last bit edge.

In a further step of the process of FIG. 3, the time when the received signal left the satellite is computed as accurate time of transmission $T_{TOT}$. The reconstructed bit addresses are known with the known SubframeNumber and LastBitNumber, which enable to determine a first component of the accurate time of transmission. The processing unit further received from the tracking unit the epoch count at the estimated last bit edge LastBitEpochCount as well as the current epoch count CurrentEpochCount, i.e. the epoch count at the time of reception of the received signal, and equally sub-millisecond chip count measurements in seconds, which is denoted as C/A and enables the determination of a second component of the accurate time of transmission. The entire accurate time of transmission $T_{TOT}$ can be computed as:

$T_{TOT} = SubframeNumber * 6s +$
$\qquad LastBitNumber * 20 \text{ ms} +$
$\qquad (CurrentEpochCount - LastBitEpochCount) * 1 \text{ ms} +$
$\qquad (IntegerChipCountInSeconds +$
$\qquad FractionalChipCountInSeconds)$ In a last step of the process of FIG. 3, the current time estimate is refined at the receiver.

The way in which this refinement takes place depends on whether the accurate time of transmission can be determined for signals of at least four or of less than four satellites.

In case signals from less than four satellites are received, the position of one satellite is calculated from the accurate time of transmission determined for this satellite and from ephemeris data received from the base station for this satellite. Then, the time of flight is calculated based on the reference position of the user provided by the base station and on the determined position of the satellite. The current time is estimated as the sum of the accurate time of transmission and the determined time of flight.

In case the accurate time of transmission is available for at least 4 satellites, also ordinary GPS position and time calculation methods can be used, e.g. a Least Squares method.

Figure 6:
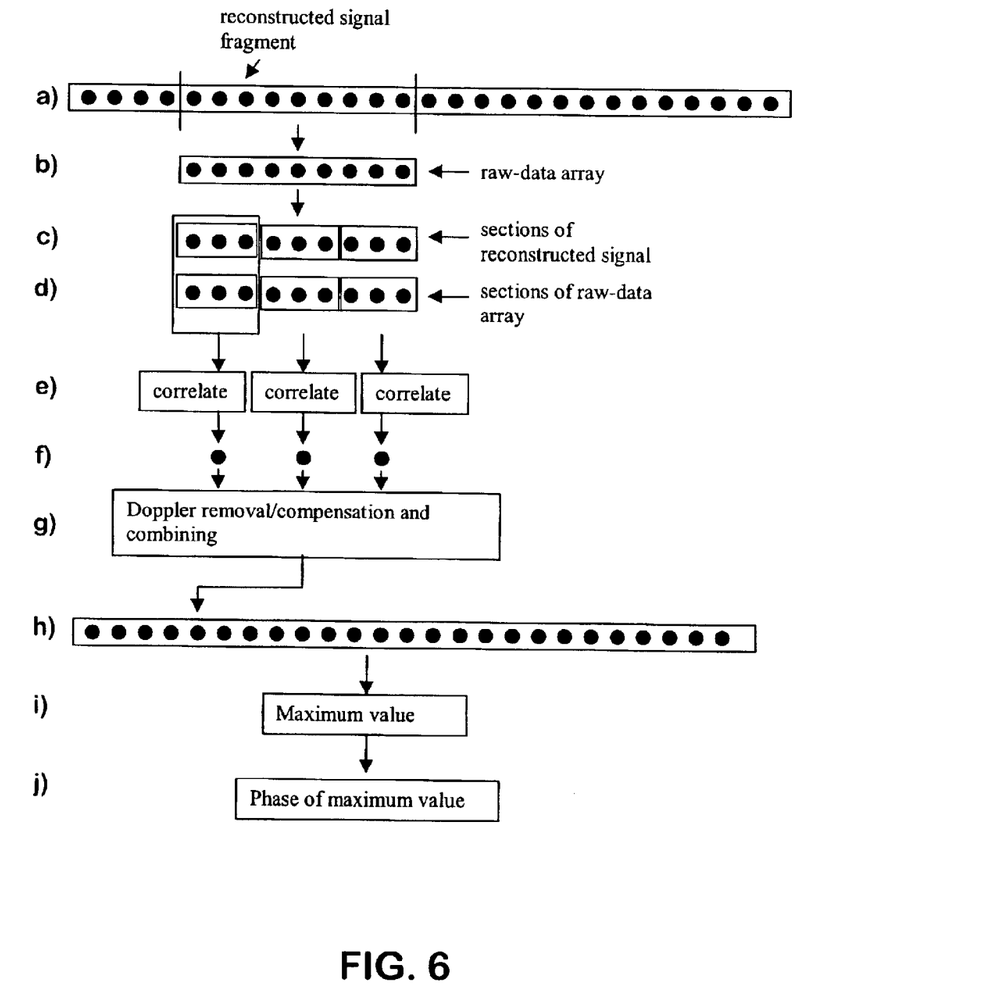
FIG. 6 illustrates in detail the cross-correlation of an embodiment of the method according to the invention employed in the process of FIG. 3.

FIG. 6 illustrates in more detail the correlation technique employed in the above described method for overcoming the problems resulting from a residual sinusoidal modulation in the raw data provided to the processing unit of the receiver, in particular a Doppler frequency.

In a first row a) of FIG. 6, an array with reconstructed bits is depicted. The array corresponds to the array represented in FIG. 5 by beam f). The replica is sampled with one sample per bit in the current example, each bit being represented in the array by a black circle.

In a second row b), an array of raw data from a tracking channel is shown. The raw data has a known number of samples per bit, each bit being represented in the array by a black circle. This array corresponds to the array represented in FIG. 5 by beam e). The satellite signal has two components I and Q, and each raw data sample is interpreted as a complex number with I and Q representing the real and imaginary parts appropriately.

The raw data array of row b) slides along the reconstructed signal of row a), and the processing unit tries to find a similar bit pattern in the replica. In the current sliding position, the array of raw data is aligned with a fragment of the reconstructed signal which is delimited in row a) by two vertical lines.

Instead of performing a cross-correlation directly on the respective two sets of data, a modified algorithm is applied, as illustrated in rows c) to h) of FIG. 6. As input for this algorithm, the array of row b) containing the raw received signal ($X_s(n)$) and an array containing a fragment of the reconstructed signal ($X_r(n)$) of row a) for a respective sliding position are provided. Further, the lengths of both arrays ($N_s$, $N_r$), the possible range of sinusoidal modulation frequencies remaining after the tracking ($\Delta F$), and the number of samples per bit ($k_{s/b}$) in the received signal are provided.

In a first step, the algorithm splits the array with the fragment of the reconstructed signal and the array with the raw data into sections of equal size, as illustrated in row c) and d), respectively. The length of the sections ($N_{ss}$) is calculated from the maximal possible Doppler frequency $\Delta F$. The length can be calculated for example by the equation:

$$N_{ss} = \text{floor}\left(\frac{1000.0 \cdot k_{s/b}}{20\Delta F}\right);$$

$\text{if}(N_{ss} = 0) \text{then } N_{ss} = 1;$ if the input to the algorithm is taken from the output of the tracking channel correlator. The function floor ( ... ) has as an output the closest integer not exceeding the value of the argument. In case the length $N_{ss}$ of the sections results in zero in this equation, the length is set to $N_{ss}=1$.

The correlation for each alignment position l is now computed by the algorithm based on two equations realizing four steps.

The first equation is used for determining the correlation $R_{section}(l, k_s)$ for each section $k_s$ at a specific alignment position l, the number of sections being denoted as $K_s$:

$$R_{section}(l, k_s) = \sum_{n_{ss}=0}^{N_{ss}-1} X_r(l + \lfloor (n_{ss} + k_s N_{ss})/k_{s/b} \rfloor) X_s(n_{ss} + k_s N_{ss}),$$

$$l = 0, 1, \ldots, N - \lfloor K_s N_{ss}/k_{s/b} \rfloor, \quad k_s = 0, 1, \ldots, K_s - 1$$

The first equation thus performs a step of a pointwise multiplication of the samples of the reconstructed signal and the raw data in each section, realized in the equation by the multiplication of $X_r$ and $X_s$. The equation further comprises the step of a coherent integration, realized in the equation by the summing element $\Sigma$.

The results of the subcorrelations, which are represented in FIG. 6 in row f), are then combined in row g) in a way compensating or removing the remaining sinusoidal modulation.

To this end, the second equation is used for determining the final correlation $R^2(l)$ at a specific alignment position l as:

$$R^2(l) = \sum_{k_s=0}^{K_s-1-k_{shift}} R_{section}(l, k_s) R^*_{section}(l, k_s + k_{shift}),$$

where $$k_{shift} = \begin{cases} 1, & N_{ss} \geq k_{s/b} \\ \mathrm{ceil}\left(\frac{k_{s/b}}{N_{ss}}\right), & N_{ss} < k_{s/b} \end{cases}$$

The function ceil ( . . . ) has as an output the closest integer exceeding the value of the argument.

The second equation thus performs a step of multiplying the subcorrelations with a conjugated version shifted by $k_{shift}$ in time, which is realized in the equation by the multiplication of $R_{section}$ and $R^*_{section}$. The second equation further performs the final step of a non-coherent integration, realized in the equation by the summing element $\Sigma$.

The resulting value for the final correlation for the current alignment position is put to a corresponding position in an array, as indicated in row h) of FIG. 6. This array corresponds to the diagram g) in FIG. 5.

When the final correlation value for all alignment positions is provided, the maximum value is determined by the algorithm, as indicated in row i) of FIG. 6.

Finally, the phase of the alignment position corresponding to this maximum correlation value is determined, as indicated in row j) of FIG. 6, in order to compute the time of transmission of the signal resulting in the raw data, as described above with reference to FIG. 3.

What is claimed is:

1. A method for determining the correlation between on the one hand a signal transmitted by a beacon and received at a receiver tracking said beacon and on the other hand a reconstructed signal expected to be received at said receiver from said beacon, wherein said received signal and said reconstructed signal are shifted against each other, said method comprising:

a) multiplying a respective overlapping part of said received signal and said reconstructed signal for each shifting position;

b) dividing the overlapping part for each shifting position into sections and integrating the products resulting in the preceding step within each section;

c) multiplying the result of the integration of a respective first section with a complex conjugated version of the result of the integration of a respective second section having a predetermined distance to the first section for a predetermined number of first sections;

d) integrating the products resulting in step c); and e) determining at least the maximum value resulting in step d) for the different shifting positions, the shifting position with the maximum value being the most probable candidate of being the shifting position with the maximum correlation.

2. A method according to claim 1, wherein the length of said sections is determined based on a maximum possible frequency of undesired sinusoidal modulations present in said received signal.

3. A method according to claim 2, wherein the length of said sections is determined in addition based on the number of samples per bit in said received signal.

4. A method according to claim 1, wherein said predetermined distance between said respective first and second section is determined based on a maximum possible frequency of undesired sinusoidal modulations present in said received signal.

5. A method according to claim 1, comprising in the multiplications of step a) taking into account a possible difference in the sampling rate in said received signal and said reconstructed signal.

6. A method according to claim 1, wherein a bit-synchronization is achieved for said received signal before performing said steps a) to d).

7. A method according to claim 1, wherein said reconstructed beacon signal is constructed by:

computing a time interval ($T_{start}$, $T_{end}$) containing the time of the transmission of a last bit edge preceding the transmission of said received beacon signal in the channel of said received beacon signal as ($T_{start}$, $T_{end}$)= ($T_{curr}-T_{TOF}-T_{FromLastBit}-T_{err}-T_{raw}$, $T_{curr}-T_{TOF}-T_{FromLastBit}+T_{err}$), wherein $T_{curr}$ is an estimated time of arrival of said received beacon signal, wherein $T_{TOF}$ is an estimated time of flight of said received beacon signal, wherein $T_{FromLastBit}$ is a determined time between an estimated time of transmission of said last bit edge and an estimated time of transmission of said received beacon signal, wherein $T_{err}$ is a total time uncertainty of the available time estimates $T_{curr}$ and $T_{TOF}$, and wherein $T_{raw}$ is the length of the received beacon signal; and reconstructing said reconstructed beacon signal for said determined time interval ($T_{start}$, $T_{end}$).

8. A method according to claim 1, wherein step e) is followed by computing the accurate time when said received signal was transmitted by said beacon, which accurate time of transmission of said received beacon signal is computed based on a bit address associated with the last bit of a fragment of said reconstructed beacon signal presenting the highest correlation value in said cross-correlation with said received beacon signal, and on the time difference between the transmission of said last bit edge and the transmission of said received beacon signal, which time difference is determined based on epoch, chip and fractional chip measurements on the channel on which said received beacon signal is received.

9. A method according to claim 1, wherein step e) is followed by computing the accurate time when said received signal was transmitted by said beacon, and by performing a time initialization of the receiver time based on said time of transmission.

10. A method according to claim 9, wherein for said time initialization, an accurate current time of said receiver at the time of reception of said received signal is determined as the sum of a determined accurate time of transmission and a time of flight, which time of flight is determined based on an available position of said beacon at the accurate time of transmission of said received signal and on an available reference position of said receiver.

11. A method according to claim 9, wherein said receiver receives signals from at least four beacons, wherein said time initialization comprises determining an accurate current time of said receiver at the time of reception of at least one of said received signals based on GPS equations utilizing the accurate time of transmission of signals from said at least four beacons, wherein the accurate time of transmission of a signal from at least one of said beacons is determined according to claim 9.

12. A method according to claim 1, wherein a network provides at least one of the following pieces of information: a reference time for the receiver, a maximum error of a reference time, a reference position of the receiver and position information for at least one beacon.

13. A method according to claim 1, wherein said beacon is a satellite.

14. A method according to claim 13, wherein said receiver is a GPS receiver and wherein said satellite is a GPS space vehicle.

15. A method according to claim 1, wherein said beacon is a base station of a communication network.

16. A receiver comprising means for receiving and tracking signals from at least one beacon and processing means for realizing the steps of the method according to claim 1.

17. A positioning system comprising a receiver and at least one network element of a network, said receiver including means for communicating with said network, receiving means for receiving and tracking signals from at least one beacon and processing means for realizing the steps of the method according to claim 1.

18. A positioning system according to claim 17, wherein said network element includes receiving means for receiving and tracking signals from said at least one beacon and means for providing said receiver with at least one of the following information: a reference time for said receiver, a maximum error of a reference time, a reference position of said receiver and position information for said beacon.

19. A positioning system according to claim 17, wherein said network is a mobile communication network.

20. A positioning system comprising a receiver and a processing unit external to said receiver, said receiver including receiving means for receiving and tracking signals from at least one beacon and means for providing received and tracked beacon signals to said processing unit, and said processing unit comprising means for realizing the steps of the method according to claim 1.

21. A positioning system according to claim 20, further comprising at least one network element of a network, wherein said processing unit comprises means for communicating with said network element, and wherein said network element includes receiving means for receiving and tracking signals from said beacon and means for providing said processing unit with at least one of the following pieces of information: a reference time for said receiver, a maximum error of a reference time, a reference position of said receiver and position information for said beacon.

22. A positioning system according to claim 21, wherein said network is a mobile communication network.

\* \* \* \* \*